United States Patent [19]

Zisman

[11] Patent Number: 5,972,303

[45] Date of Patent: Oct. 26, 1999

[54] OLEFIN PURIFICATION

[75] Inventor: Stan A. Zisman, Bartlesville, Okla.

[73] Assignee: Phillips Petroleum Company, Bartlesville, Okla.

[21] Appl. No.: 08/406,272

[22] Filed: Mar. 16, 1995

Related U.S. Application Data

[63] Continuation of application No. 08/181,738, Jan. 18, 1994, abandoned.

[51] Int. Cl.$^6$ ............................ B01D 53/14; B01D 53/62
[52] U.S. Cl. ........................ 423/230; 423/232; 210/660; 210/749; 585/824
[58] Field of Search .................................. 423/230, 225, 423/232; 585/824; 210/660, 749

[56] References Cited

U.S. PATENT DOCUMENTS

| | | | |
|---|---|---|---|
| 1,982,223 | 11/1934 | Metzger et al. | 23/150 |
| 3,000,988 | 9/1961 | Karchmer et al. | 260/677 |
| 3,078,637 | 2/1963 | Milton | 55/68 |
| 3,141,729 | 7/1964 | Clarke et al. | 23/4 |
| 3,315,003 | 4/1967 | Khelghation | 260/677 |
| 3,517,484 | 6/1970 | Lee et al. | 55/73 |
| 3,619,130 | 11/1971 | Ventriglio et al. | 23/25 |
| 3,812,200 | 5/1974 | Grey et al. | 260/677 A |
| 3,847,837 | 11/1974 | Boryta | 252/468 |
| 3,865,924 | 2/1975 | Gidaspow et al. | 423/230 |
| 3,867,113 | 2/1975 | Foster et al. | 55/44 |
| 3,880,618 | 4/1975 | McCrea et al. | 55/68 |
| 3,885,927 | 5/1975 | Sherman et al. | 55/68 |
| 3,943,226 | 3/1976 | Difford | 423/230 |
| 4,039,620 | 8/1977 | Netteland et al. | 423/230 |
| 4,063,899 | 12/1977 | Cheron et al. | 261/99 |
| 4,313,916 | 2/1982 | Jones et al. | 585/824 |
| 4,384,160 | 5/1983 | Skraba | 585/650 |
| 4,493,715 | 1/1985 | Hogan et al. | 55/68 |
| 5,041,693 | 8/1991 | Zarchy | 423/244.07 |
| 5,090,977 | 2/1992 | Strack et al. | 208/351 |
| 5,302,771 | 4/1994 | Venkatram et al. | 585/824 |

FOREIGN PATENT DOCUMENTS

| | | |
|---|---|---|
| 2194523 | 3/1988 | United Kingdom . |
| 2267096 | 11/1993 | United Kingdom ................... 423/230 |

OTHER PUBLICATIONS

Kirk–Othmer Encycl. Chem. Technol., vol. 2, pp. 492–493 (1978).
Kirk–Othmer Encycl. Chem. Technol., vol. 4, pp. 730–736 (1978).
Hawley's Condensed Chemical Dictionary (7th ed., 1987).
Hydrocarbon Processing (Apr. 1992).
Molecular Products Technical Data (May 1993).

*Primary Examiner*—Wayne Langel
*Assistant Examiner*—Peter DiMauro
*Attorney, Agent, or Firm*—Richmond, Hitchcock Fish & Dollar

[57] ABSTRACT

A process for purifying a fluid stream contaminated with carbon dioxide is provided which comprises contacting, under conditions sufficient to substantially remove the contaminated carbon dioxide from the fluid stream which contains at least one $C_2$–$C_5$ olefin such as ethylene or propylene, with a composition containing an oxygen-containing metal compound such as, for example, an alkaline earth metal hydroxide. The contacting is carried out in the presence of water.

18 Claims, 2 Drawing Sheets

OLEFIN PURIFICATION

This application is a Continuation of application Ser. No. 08/181,738, filed Jan. 18, 1994, now abandoned.

FIELD OF THE INVENTION

The present invention relates to a process for substantially removing carbon dioxide from a fluid containing at least one olefin where the fluid is contaminated with carbon dioxide.

BACKGROUND OF THE INVENTION

Olefin is a class of industrial chemicals useful as, for example, monomers or comonomers for the synthesis of polyolefins. However, the olefin must be substantially pure when it is used for synthesizing polyolefin, especially when the polyolefin is prepared in the presence of a high activity catalyst because any appreciable concentration of impurities can be detrimental to the catalyst. One of the impurities is carbon dioxide, a well-known catalyst inhibitor.

Alumina is a well known adsorbent in many chemical processes such as the polymerization of olefins, e.g. ethylene, for the removal of water and small concentrations of methanol, carbonyl-containing compounds, and peroxides. However, the use of alumina has disadvantages that impair its effectiveness as an adsorbent. For example, alumina has a low capacity when used as an adsorbent for the removal of $CO_2$ from an olefin fluid stream which contains $CO_2$ at low level concentrations and alumina must be regenerated when it becomes saturated with $CO_2$. Incurred regeneration costs over time dramatically impact the economics of its use.

Molecular sieves are frequently used as adsorbents for $CO_2$, but are inefficient when used for the removal of $CO_2$ from a fluid stream containing low molecular weight olefins such as ethylene.

Caustic scrubbers or bulk caustic scrubbers can also function as absorbents for $CO_2$ from a gaseous stream but have the disadvantages of being hazardous, and subject to water attack with subsequent caking thus severely limiting their capacity. It is therefore an increasing need to develop a more efficient process which is capable of reducing the carbon dioxide concentration in a fluid which contains an olefin to such levels that the $CO_2$ is not detrimental to catalyst activity in polymerization processes using the olefin.

SUMMARY OF THE INVENTION

An object of the present invention is to develop a composition for use in adsorbing carbon dioxide. Another object of the invention is to provide a process for removing carbon dioxide from a fluid stream employing the composition. An advantage of the present invention is that the composition provides a high loading capacity for adsorbing carbon dioxide. Other objects, advantages, and features will become more apparent as the invention is more fully disclosed hereinbelow.

According to the present invention, a process for removing carbon dioxide is provided which comprises contacting a fluid, in the presence of water, with a composition which comprises an oxygen-containing metal compound wherein the fluid can be a gas stream, or a liquid stream, or both, and contains at least one $C_2$–$C_6$ olefin and carbon dioxide. The process is generally carried out under conditions sufficient to remove the carbon dioxide from the fluid and the composition is present in an effective amount to substantially remove the carbon dioxide from the fluid. The water is generally present in the fluid in an effective amount to sufficiently and substantially remove the $CO_2$ contaminated in the fluid.

DETAILED DESCRIPTION OF THE INVENTION

Figure 1:
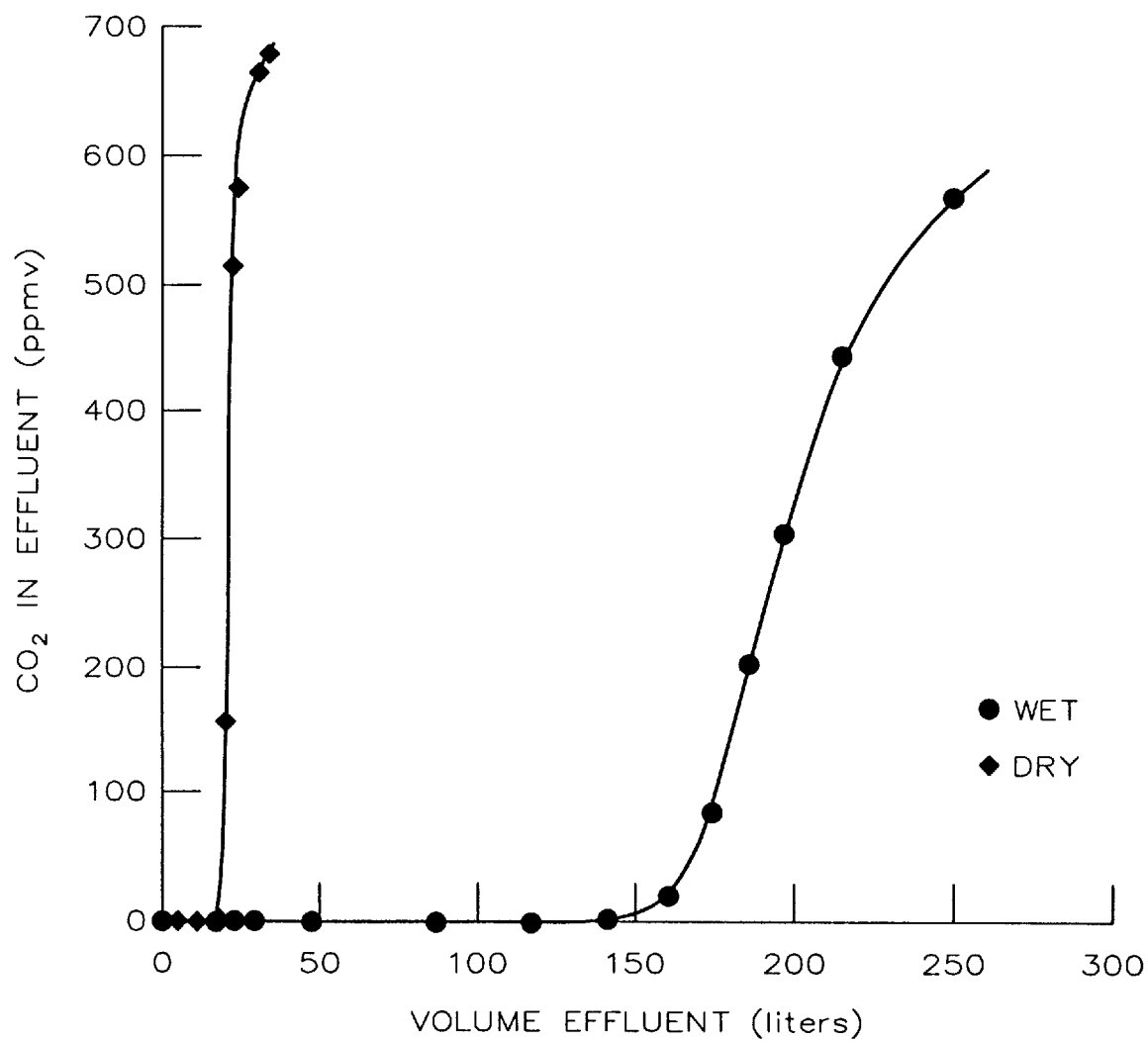
FIG. 1 is a comparison between carbon dioxide removal from a fluid stream containing ethylene in the presence of water (●—●) and that in the absence of water (♦—♦) under atmospheric pressure.

According to the present invention, a fluid stream containing at least one $C_2$–$C_5$ olefin and a contaminated amount of carbon dioxide is contacted, in the presence of water, with a composition containing at least one oxygen-containing metal compound. The olefin can be a normal or a branched olefin. The double bond can be at any position in the molecule. Examples of suitable olefins include ethylene, propylene, 1-butene, 2-butene, 2-methyl-1-butene, 1-pentene, 2-pentene, 3-methyl-1-butene, 4-methyl-1-pentene, and combinations of two or more thereof. The presently preferred olefin is ethylene, or propylene, or both.

The oxygen-containing metal compound is generally an alkali metal compound or an alkaline earth metal compound including an alkali metal oxide, an alkali metal hydroxide, an alkaline earth metal oxide, an alkaline earth metal hydroxide, and combinations of two or more thereof. Examples of suitable oxygen-containing metal compounds include, but are not limited to, sodium oxide, sodium hydroxide, potassium oxide, potassium hydroxide, calcium oxide, calcium hydroxide, magnesium oxide, magnesium hydroxide, and combinations of two or more thereof. The presently preferred oxygen-containing metal compound is soda lime which is a mixture of calcium hydroxide, sodium hydroxide or potassium hydroxide or both because of its ready availability and low cost.

The weight ratio of an oxygen-containing metal compound to another oxygen-containing compound, when used as a mixture of more than one oxygen-containing compound can vary widely from as low as 0.001:1 to as high as 1000:1.

Generally the amount of the carbon dioxide adsorbent composition used can vary widely depending on the concentration of carbon dioxide in the fluid stream to be removed as well as on the total quantity of the fluid to be treated and is an effective amount to substantially remove the carbon dioxide from the fluid. According to the present invention, the weight ratio of the carbon dioxide to the olefin is generally in the range of from about 0.000001:1 to about 0.1:1, some times 0.00001:1 to 0.01:1. Based on the contamination level of carbon dioxide in the fluid, as just described, the amount of the adsorbent required is dependent on the concentration of contaminating $CO_2$ in the fluid and is an effective amount for substantially removing the $CO_2$. It generally can be in the range of from about 1 to about 20 g, preferably about 2 to about 10 g, and most preferably 2 to 5 g of the oxygen-containing metal compound per g of the $CO_2$ in the fluid to be treated, to 5% breakthrough, for carbon dioxide removal. A 5% breakthrough refers to the point in the invention process where the $CO_2$ concentration in the effluent fluid stream has reached 5% of the $CO_2$ concentration in the inlet fluid stream.

According to the present invention, the term "water" used herein generically refers to, unless otherwise indicated, pure water, regular tap water, a solution or suspension wherein the solution or suspension contain a variety of salts. The term "water" is also referred to liquid water, vapor water, or both. The weight ratio of water to the fluid can vary widely from about 0.0001:1 to about 0.1:1, preferably 0.001:1 to about 0.05:1, and most preferably 0.003:1 to 0.01:1.

According to the present invention, the composition, if containing a mixture of more than one oxygen-containing metal compound, can be prepared by simply combining the oxygen-containing metal compounds. The combining can be carried out by any methods known in the art such as, for example, mixing or blending. The composition can be used in the invention process as it is prepared or can be heated to remove moisture, if present in appreciable concentration.

The rate the fluid is contacted with the composition is not critical but can vary with reaction vessel size. Broadly, the rate of fluid introduction can be about 1 to about 30, preferably about 3 to about 20, and most preferably 5 to 10 WHSV (weight hourly space velocity; g of the fluid per g of the oxygen-containing metal compound per hour). The rate of gaseous fluid introduction can also be expressed in total volume of fluid per minute per g of the oxygen-containing metal compound and it is generally in the range from about 13 to about 400 cm$^3$/min-g. The rate often varies as a function of the pressure employed in introducing to fluid which is generally in the range of from about 0 to about 2500 psig, preferably about 0 to about 2000 psig, and most preferably 0 to 1700 psig. In any event, it should be at a rate sufficient to effect efficient contact between the fluid and the composition.

According to the invention, the process can be carried out at a temperature sufficient to effect a substantial removal of the carbon dioxide from the fluid. Generally, the temperature can be in the range of from about 1 to about 200° C., preferably about 1 to about 100° C., and most preferably 1 to 50° C. Generally the time required for $CO_2$ removal in a batch mode is dependent upon the concentration of the carbon dioxide in the fluid, the amount of the composition used, or the amount of the fluid to be treated, or combinations thereof.

The process of the present invention can be carried out in any suitable vessel or device. The choice of a suitable device is a matter of preference to one skilled in the art. The process is also well suited for a continuous process in which the fluid is continuously introduced over a bed of the adsorbent composition under a desired process condition. Once the adsorbent composition approaches saturation with carbon dioxide, to a point of increasing breakthrough of $CO_2$ concentration in the effluent fluid, a new batch of the composition can be used.

The following examples further illustrates the present invention and are not intended to unduly limit the scope of the invention.

EXAMPLE I

This example is a comparison between $CO_2$ removal from ethylene fluid stream under atmospheric pressure at room temperature, in the presence and that in the absence of water, using soda lime (purchased from the O.C. Lugo Co., Inc. Nyack, N.Y. under the trade name of SOFNOLIME RG) as adsorbent.

For $CO_2$ removal from dry ethylene, gaseous ethylene containing 713.8 ppm of $CO_2$ by volume in a cylinder was fed at a rate of 100 cm$^3$/min through a glass reactor (7 mm in diameter and 10 in. in length) packed with 2.0 g of soda lime (10–20 mesh). The $CO_2$ content in the effluent stream was measured with a gas chromatograph equipped with a flame ionization detector and having methanation capacity. Loading at 10% breakthrough was about 20.2 liters of ethylene with about 5.7 g of $CO_2$ adsorbed per 100 g of soda lime. Loading at 50% breakthrough was about 21.8 liters with about 1.5 g of $CO_2$ adsorbed per 100 g of soda lime. A 10% breakthrough denoted the point where the $CO_2$ content in the effluent fluid stream had reached 10% of the $CO_2$ concentration in the inlet fluid stream. The $CO_2$ concentration in inlet fluid stream was also measured by the gas chromatograph as described above.

For $CO_2$ removal from wet ethylene fluid, ethylene containing 713.8 ppm of $CO_2$ by volume was first saturated with water using a water bubbler. The water-saturated ethylene was then fed through a glass reactor as described above with the exception that the reactor was packed with only 0.5 g of soda lime. Results showed that loading at 10% breakthrough was about 171.4 liters of total fluid with about 48.1 g $CO_2$ adsorbed per 100 g of soda lime and that loading at 50% breakthrough was about 203.2 liters of fluid treated with about 57 g of $CO_2$ adsorbed per 100 g of soda lime used.

The effect of moisture in the fluid was dramatic. In the presence of water (saturated, gaseous, room temperature), a $CO_2$ capacity of about 57 wt % was realized for the soda lime adsorbent. A capacity of 1.5 wt % was observed for the test involving the dry fluid. Moisture in the fluid was necessary in that it served to provide available surface area on the soda lime for the reaction with $CO_2$ to occur. Although water was a product of the reaction of $CaOH_2$ with $CO_2$, it was not generated in the amount necessary to promote continued chemisorption; therefore, moisture in the fluid not only enhanced capacity but also served to alleviate the problem of premature breakthrough.

The results were also plotted as FIG. 1 which clearly shows that the $CO_2$ content in effluent ethylene fluid started rising sharply with less than 20 liters of dry fluid being treated and that the $CO_2$ content did not show any appreciable increase until after about 150 liters of water-saturated ethylene fluid was treated. FIG. 1 further demonstrates that, even with only 0.5 g of absorbent in the invention run, the $CO_2$ capacity in the invention run was many times higher than that of the control run with 2.0 g of absorbent.

In conclusion, this example demonstrates that soda lime removed much more $CO_2$ from wet ethylene fluid than from dry ethylene fluid.

EXAMPLE II

This example illustrates that the invention process is also applicable to removing $CO_2$ from ethylene fluid when operated under an elevated pressure at room temperature.

For $CO_2$ removal from dry ethylene fluid, ethylene containing 3717 ppm of $CO_2$ by volume was first reacted with 3A molecular sieve to remove trace moisture followed by passing over a stainless steel reactor (0.687 inch inner diameter and 20 in. in length) which had been charged with 10 g of soda lime described in Example I. The feed rate of the ethylene was 5.5 WHSV (weight hourly space velocity; g ethylene per g soda lime per hour). The reactor was operated under an ethylene pressure of 1000 psig. The $CO_2$ content in the effluent ethylene was determined as described in Example I.

For $CO_2$ removal from wet ethylene fluid, water was first added to ethylene containing 3197 ppm of $CO_2$ by volume (the final water concentration was approximately 500 ppm by weight at room temperature). The rest of the run was carried out the same as that described above for running the dry ethylene.

In the presence of water (approximately 500 ppmw), a $CO_2$ capacity of 46.8 wt % was realized for the adsorbent. A capacity of 46.6 wt % was observed for the test involving the dry fluid; however, preliminary breakthrough of $CO_2$ did occur early in the experiment (as high as 860 ppmv, about 82 liters of effluent gas). Commercial applications dependent on effluent specifications could not tolerate such upsets; therefore, entrained moisture in the fluid feed can serve as a preventative measure to premature breakthrough.

Figure 2:
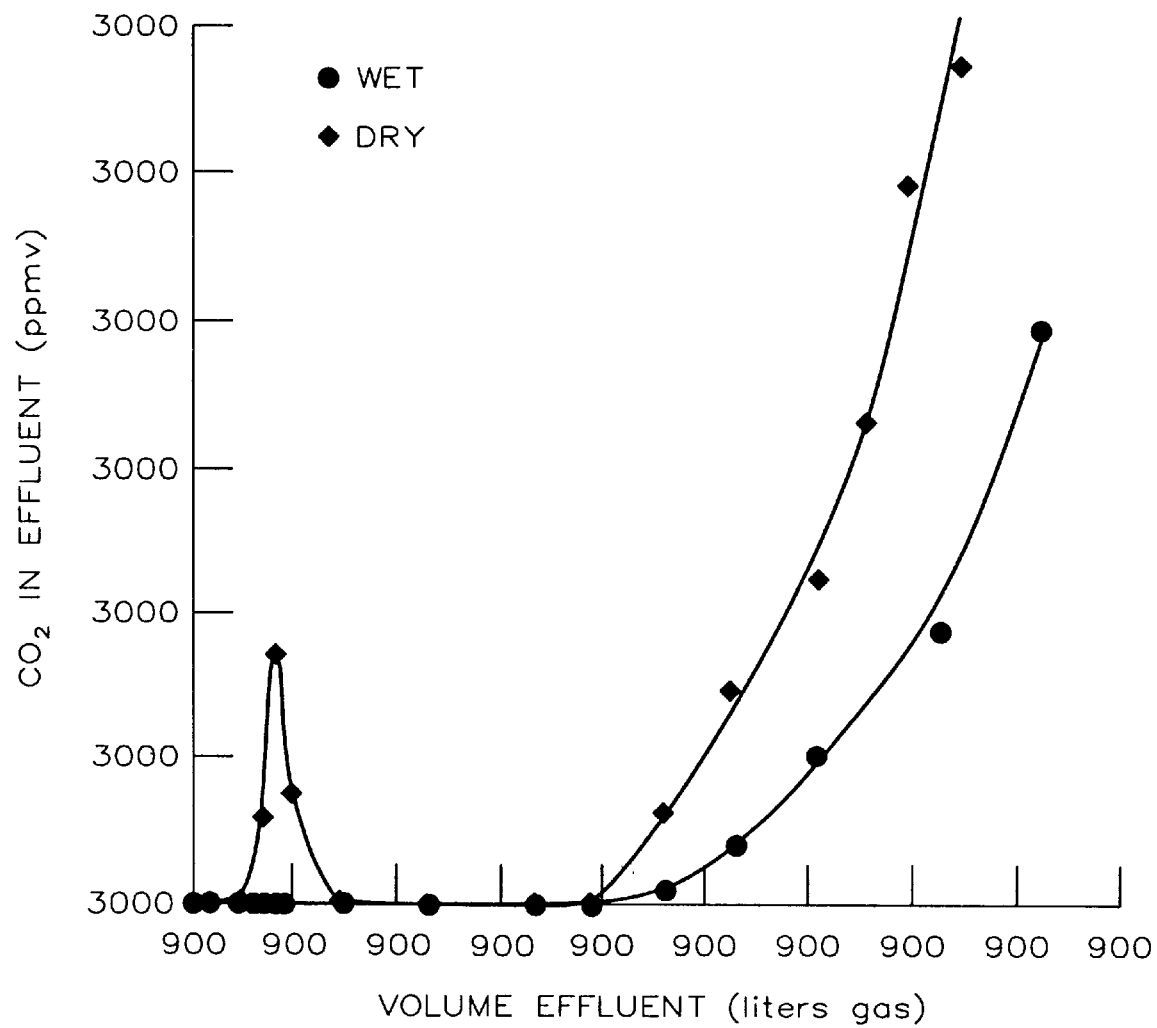
FIG. 2 is a comparison between carbon dioxide removal from a fluid stream containing ethylene in the absence of water (♦—♦) and that in the presence of water (●—●) under a 1,000 psig pressure.

The results are plotted as shown in FIG. 2. As can be seen in the figure, the $CO_2$ content in the effluent ethylene fluid, when dry fluid was fed through the reactor, started to increase after about 50 liters of fluid was fed through the reactor and reached a peak of 860 ppm by volume after about 82 liters of the dry fluid was fed through the reactor. The $CO_2$ content in the effluent fluid thereafter gradually decreased to acceptable level until the total volume of ethylene fed through the reactor reached about 390 liters. Wishing not be bound by theory, the spike in $CO_2$ content in the effluent fluid was probably due to lack of available water necessary to expose fresh surface for chemisorption. In the absence of water, the $CO_2$ content in the effluent fluid reached a high of 860 ppm by volume. Enough water was then formed when the $CO_2$ content reached the 860 ppm level and the water thus formed facilitated the $CO_2$ removal from the ethylene fluid. This phenomenon supported the invention process of removing $CO_2$ from a fluid by contacting the fluid in the presence of water with a composition comprising an oxygen-containing metal compound. It should be noted, however, the effluent ethylene having high $CO_2$ content in the dry ethylene run is not acceptable for polymerization process.

FIG. 2 further shows that the $CO_2$ content in the effluent fluid was essentially not detectable when water was added to the ethylene fluid fed to 500 ppm by volume until after about 400 liters of the wet ethylene had been fed through the reactor.

The results shown in the above example clearly demonstrate that the present invention is well adapted to carry out the objects and attain the ends and advantages mentioned as well was those inherent therein. While modifications may be made by those skilled in the art, such modifications are encompassed within the spirit of the present invention as defined by the disclosure and the claims.

That which is claimed is:

1. A process comprising the steps of:
   (1) adding water to a fluid to form a water-containing fluid which is saturated with water; and thereafter
   (2) contacting said saturated water-containing fluid with a composition which comprises an oxygen-containing metal compound selected from the group consisting of an alkali metal compound, an alkaline earth metal compound, and combinations of two or more thereof; wherein said fluid comprises at least one $C_2$–$C_6$ olefin and carbon dioxide; the physical form of said fluid is selected from the group consisting of gas, liquid, and combinations thereof; said process is carried out under conditions sufficient to substantially remove said carbon dioxide from said fluid; and said composition and said water are each present in an effective amount to substantially remove said carbon dioxide from said fluid.

2. A process according to claim 1 wherein said olefin is ethylene.

3. A process according to claim 1 wherein said olefin is propylene.

4. A process according to claim 1 wherein said oxygen-containing metal compound is selected from the group consisting of alkali metal oxides, alkali metal hydroxides, alkaline earth metal oxides, alkaline earth metal hydroxides, and combinations of two or more thereof.

5. A process according to claim 1 wherein said oxygen-containing metal compound is selected from the group consisting of sodium oxide, sodium hydroxide, potassium oxide, potassium hydroxide, calcium hydroxide, calcium oxide, magnesium oxide, magnesium hydroxide, and combinations of two or more thereof.

6. A process according to claim 1 wherein said oxygen-containing metal compound is a combination of sodium hydroxide and calcium hydroxide (soda lime).

7. A process according to claim 1 wherein the weight ratio of said carbon dioxide to said olefin is in the range of from about 0.000001:1 to about 0.1:1.

8. A process according to claim 1 wherein the weight ratio of said carbon dioxide to said olefin is in the range of from 0.000001:1 to 0.01:1.

9. A process according to claim 1 wherein the amount of said oxygen-containing metal compound is in the range of from about 1 to about 20 g per g of $CO_2$ in said fluid which is contacted with said oxygen-containing compound.

10. A process according to claim 1 wherein the amount of said oxygen-containing metal compound is in the range of from about 2 to about 10 g per g of CO in said fluid which is contacted with said oxygen-containing compound.

11. A process according to claim 1 wherein the amount of said oxygen-containing metal compound is in the range of from 2 to 5 g per g of $CO_2$ in said fluid which is contacted with said oxygen-containing compound.

12. A process according to claim 1 wherein the weight ratio of said water to said fluid is in the range of from about 0.0001:1 to about 0.1:1.

13. A process according to claim 1 wherein the weight ratio of said water to said fluid is in the range of from about 0.001:1 to about 0.05:1.

14. A process according to claim 1 wherein the weight ratio of said water to said fluid is in the range of from 0.003:1 to 0.01:1.

15. A process according to claim 1 wherein step (2) of said process is carried out at a temperature in the range of from about 1° C. to about 200° C.

16. A process according to claim 1 wherein step (2) of said process is carried out at a temperature in the range of from 1° C. to 50° C.

17. A process according to claim 1 wherein step (2) of said process is carried out under a pressure in the range of from about 0 psig to about 2500 psig.

18. A process according to claim 1 wherein step (2) of said process is carried out under a process of from 0 psig to 1700 psig.

* * * * *